(12) United States Patent
Kishigami

(10) Patent No.: US 6,633,866 B2
(45) Date of Patent: *Oct. 14, 2003

(54) DATA SEARCH APPARATUS AND INTERNETWORK RELAY APPARATUS USING DATA SEARCH APPARATUS

(75) Inventor: Tohru Kishigami, Ome (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,239

(22) Filed: Dec. 27, 1999

(65) Prior Publication Data

US 2003/0144993 A1 Jul. 31, 2003

(30) Foreign Application Priority Data

Dec. 28, 1998 (JP) .......................................... 10-373384

(51) Int. Cl.[7] ................................................ G06F 7/00
(52) U.S. Cl. ................................ 707/3; 707/1; 707/10; 709/230; 709/238; 370/392; 370/401; 370/474
(58) Field of Search .................... 707/1, 3, 10; 709/230, 709/238; 370/392, 401, 474

(56) References Cited

U.S. PATENT DOCUMENTS 5,278,980 A 1/1994 Pedersen et al.
5,469,354 A * 11/1995 Hatakeyama et al. .......... 707/3

* cited by examiner

Primary Examiner—Kim Vu
Assistant Examiner—Hung Pham
(74) Attorney, Agent, or Firm—Finnegan, Henderson, Farabow, Garrett & Dunner, L.L.P.

(57) ABSTRACT

Header data representing a frame form and a protocol is divided into each two bytes to set a plurality of search sequences, and, for each sequence, an entry comprising the divided two bytes serving as Key Data, a search identifier comprising Group number and Sequence number, and associative data representing the contents of search control is created. The entry is preliminarily registered in a protocol table. Each time when frame data is stored in a frame buffer, a search is performed in the protocol table using 2 bytes as a key positioned at a specific position of the frame data by a protocol analysis portion, and the search in the protocol table is repeated until a search is terminated according to the contents of the associative data read out from the protocol table by the search.

2 Claims, 5 Drawing Sheets

DIX FORM IPv4 FRAME FORMAT

LLC HEADER+SNAP HEADER FORM IPX FRAME FORMAT

PROTOCOL TABLE SETTING EXAMPLE OF DIX FORM IPv4

| GROUP | SEQUENCE NO. | KEY DATA | NEXT OPERATION | NEXT GROUP | NEXT POINTER |
|---|---|---|---|---|---|
| 1 | 0 | 0xAAA | SEARCH | 1 | 0x02 |
| 1 | 1 | 0x0300 | SEARCH | 1 | 0x02 |
| 1 | 2 | 0x0000 | SEARCH | 1 | 0x02 |

| GROUP | SEQUENCE NO. | KEY DATA | NEXT OPERATION | L2 FRAME | L3 PROTOCOL | L3 HEADER POINTER |
|---|---|---|---|---|---|---|
| 1 | 3 | 0x8137 | END | LLC+SNAP | IPX | 0x16 |

←—— DATA TO BE SEARCHED FOR ——→ ←—————— ASSOCIATIVE DATA ——————→

PROTOCOL TABLE SETTING EXAMPLE OF LLC HEADER+SNAP HEADER FORM IPX

FIG. 8

FRAME 1: | 0x0200 | 0x0800 | 0x0400 | 0x0000 | 0x0000 | 0x0720 |

FRAME 2: | 0x0200 | 0xAAAA | 0x0300 | 0x0000 | 0x0800 | 0x4500 |

FRAME 3: | 0x0200 | 0xAAAA | 0x0300 | 0x0007 | 0x0800 | 0x4500 |

ANALYSIS FRAME EXAMPLES

FIG. 9

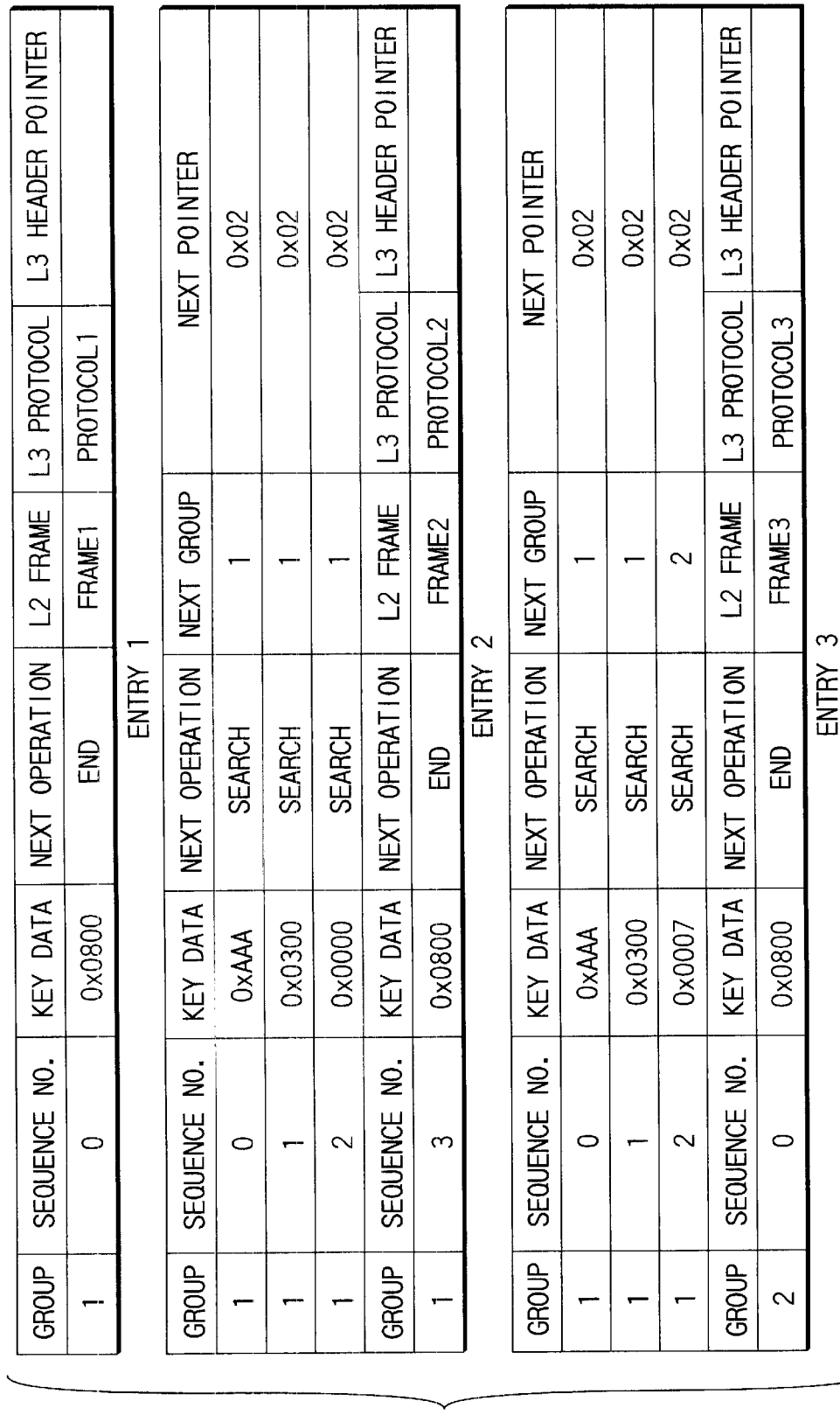
FIG. 10 PROTOCOL TABLE SETTING EXAMPLE

DATA SEARCH APPARATUS AND INTERNETWORK RELAY APPARATUS USING DATA SEARCH APPARATUS

Japanese Patent Application No. 10-373384 has not been published in English under Article 21(2) of the Patent Cooperation Treaty.

BACKGROUND OF THE INVENTION

This application is based on Japanese Patent Application No. 10-373384, filed Dec. 28, 1998, the contents of which is incorporated herein by reference.

The present invention relates to a data search apparatus and an internetwork relay apparatus which mutually connects a plurality of networks such as LAN (Local Area Network), WAN (Wide Area Network), and the like to one another to perform data exchange and relay in a data link layer and a network layer.

In a communication network system including such a network as LAN, WAN, and the like, an internetwork relaying apparatus which is called a router, a layer 3 switch or the like has been used.

In general, an apparatus of this type determines a transmission destination from a destination address of a received frame to perform relay processing for transmitting the frame to a desired destination, in which the relay processing is performed for each processing of frame receipt, protocol analysis, destination determination and frame destination processings.

FIG. 1 illustrates one example of a configuration of a conventional internetwork relay apparatus which comprises a frame receipt portion 11, a frame buffer 12, a protocol analysis portion 13, a destination determination portion 14, a forwarding table 15, a frame transmission portion 16, and a control portion 17.

The frame receipt portion 11 receives a frame transmitted from an upstream network (not shown) to store the received frame in the frame buffer 12. Then, for each completion of reception of the frame, the frame receipt portion 11 notifies the control portion 17 of completion of reception and receives a frame buffer address for storing the next frame from the control portion 17.

When the protocol analysis portion 13 is notified from the control portion 17 that an unprocessed frame has been stored in the frame buffer 12, it reads frame data from the frame buffer 12 to perform a determination about a layer 2 frame form and a layer 3 protocol of the frame using a comparator inside the protocol analysis portion 13. Then, after completion of the determination, the protocol analysis portion 13 stores the determination result in the frame buffer 12 and notifies a completion notification to the control portion 17. Also, when another unprocessed frame has been stored in the frame buffer 12, further protocol analysis processing is performed.

When the destination determination portion 14 is notified from the control portion 17 that an unprocessed frame has been stored in the frame buffer 12, it reads a destination address included in a header of the received frame from the frame buffer 12 to determine a destination of the frame using the forwarding table 15. Then, after completion of the determination, the destination determination portion 14 stores the destination of the frame in the frame buffer 12 and notifies a completion notification to the control portion 17. This destination determination processing is performed on each of all the unprocessed frames which have been stored in the frame buffer 12.

Since processings to be performed and data positions to be processed are different due to difference in layer 2 frame form and layer 3 protocol, the destination determination processing is performed by reading the frame data, after the determination results about the layer 2 frame form and the layer 3 protocol which have been obtained by the protocol analysis portion 13 and which have been stored in the frame buffer 12 is read out.

As soon as the frame transmission portion 16 is notified from the control portion 17 that a frame to be transmitted has been stored in the frame buffer 12, it reads a destination to be transmitted and a data frame to be transmitted on the basis of the frame buffer address which has been notified from the control portion 17 to transmit the same to a desired destination. Then, when the transmission is completed, a completion notification is notified to the control portion 17.

The control portion 17 performs control among respective processings and manages a frame buffer address in which an unprocessed frame has been stored for each processing.

The protocol analysis portion 13 is configured in the following manner. FIG. 2 is a circuit block diagram showing a configuration of the protocol analysis portion 13. That is, the protocol analysis portion 13 comprises a protocol analysis processing control portion 21, and a plurality of comparators 221 to 22n provided so as to correspond to types of the layer 2 frame form and the layer 3 protocol.

As soon as the protocol analysis processing control portion 21 is notified from the control portion 17 that an unprocessed frame has been stored in the frame buffer 12, it reads the frame data from the frame buffer 12 on the basis of the frame buffer address which has been notified from the control portion 17, and notifies the respective comparators 221 to 22n of what byte the read data is from a head of the frame.

Data (field data representing a protocol) to be compared with the frame data read from the frame buffer 12 is preliminarily stored in each of the comparators 221 to 22n, and the respective comparators 221 to 22n determine which of set data the read data coincides with. When the read data coincides with any of the set data, the layer 2 frame form and the layer 3 protocol of the frame are identified. Also, a data position to be compared is preliminarily set with the number of bytes counted from a head of a frame for each of the comparators 221 to 22n, and data to be compared is inputted to each of the comparators 221 to 22n, taking account of the position information provided from the protocol analysis processing control portion 21.

For example, in a comparator where a frame format having a DIX (DEC/Intel/Xerox) as the layer 2 frame form and an IPv4 as the layer 3 protocol on Ethernet is identified, the following identification processing is performed. That is, in order to identify the frame format having the DIX and the IPv4, it is required that Type field positioned at the 13th to the 14th bytes is 0x0800. Therefore, in the comparator, data to be compared is set to 0x0800 and the position is set to the 13th to the 14th bytes.

Also, in order to identify a frame format where the layer 2 frame form is LLC (Logical Link Control) header+SNAP (Subnetwork Packet Protocol) on Ethernet and the layer 3 protocol is IPX (Internetwork Packet Exchange), it is required that the 13th to the 14th bytes of a frame are at most 1500 and the 15th to the 22th bytes are 0xAAAA030000008137. For this reason, in the comparator for identifying this frame format, a circuit for determining that the 13th and the 14th bytes are less than or equal to 1500 and information for indicating that the 15th to the 22th bytes is 0xAAAA030000008137 are set.

When the protocol analysis processing control portion 13 is notified of correspondence of data from any one of the comparators, the corresponding layer 2 frame form and the layer 3 protocol are respectively written in the same frame buffer region where the frame data has been stored. Then, after the writing, the control portion 17 is notified of completion of the protocol analysis.

However, there are the following problems to be solved in a conventional apparatus for performing such protocol processings. That is, the reason why the protocol analysis is required is because it is assumed that a plurality of layer 3 protocols which have been received in a plurality of layer 2 frame forms are processed in a relay processing. In a conventional approach, since the comparators 221 to 22n for identification are provided for respective layer 2 frame forms and layer 3 protocols, a circuit for the protocol analysis portion 13 is large-scaled when the number of kinds of layer 2 frame forms and layer 3 protocols is increased.

Also, when a novel layer 2 frame form or a novel layer 3 protocol must be identified, a dedicated comparator must be added. Therefore, a hardware change may be required for each of a novel issue, a modification and the like of standard/reference or for each specification change.

On the other hand, it is thought that a conventional memory is used for identification of a layer 2 frame form and a layer 3 protocol. In this case, entries used to make a determination for each layer 2 frame form and layer 3 protocol are read one by one, the entries are sequentially compared with the frame to be processed, and a series of processings are performed repeatedly until an entry coinciding with the frame to be processed is found out. Accordingly, when the number of readings of entry is increased, processing performance is lowered.

BRIEF SUMMARY OF THE INVENTION

An object of the present invention is to provide an internetwork relay apparatus which makes a number of comparators unnecessary to reduce a circuit scale and easily accommodates to change in standard and/or specification, and which makes a number of memory read operations unnecessary to maintain processing performance high.

In order to achieve the above object, the present invention is an internetwork relay apparatus where, from the contents of field data of a received transmission frame, a form and a protocol of the transmission frame are analyzed and a relay processing is performed on the transmission frame according to the analyzed result, comprising a content addressable memory where field data representing a frame form and a protocol of each of all transmission frames to be subjected to relay processing is divided into a plurality of portion data each having a predetermined length, a plurality of search sequences different from one another are set on the basis of the portion data, and, for each of the search sequences, associative data representing the contents of search control in the sequence is preliminarily stored so as to be associated with the portion data configuring the search sequence and a search identifier representing the search sequence. Then, each time when the received transmission frame is stored in a frame buffer memory, one of the portion data of the transmission frame is selectively read out from the field data of the transmission frame and a search in the content addressable memory is performed on the basis of the read portion data and the search identifier representing the search sequence by first search means. Also, another portion data of the field data is read from the frame buffer memory according to an instruction of the associative data read from the content addressable memory, and a search in the content addresssable memory is performed on the basis of the read other portion data and the search identifier included in the associative data by second search means. The internetwork relay apparatus is also provided with determination means where a search completion or a search continuation is determined on the basis of the contents of the associative data read from the content addressable memory by the first and second search means. In a case of the search continuation, search processing by the second search means is performed repeatedly, while information representing the form and protocol of the received transmission frame included in the above read associative data is output in a case of the search termination.

Thus, according to the present invention, for example, analysis of a layer 2 frame form and a layer 3 protocol can be identified by data which has been registered in the content addressable memory. Accordingly, even when there are many types of layer 2 frame forms and layer 3 protocols to be identified, it is unnecessary to provide comparators for the respective types so that a circuit scale of a protocol analysis portion can be maintained constant.

Also, even when it is necessary to identify a novel layer 2 frame form or a novel layer 3 protocol, such an identification can be performed only by registering corresponding data in the content addressable memory, and it is unnecessary to add a new circuit.

Furthermore, since a search is performed in the content addressable memory with a combination of a portion of field data and a search identifier as a key, even when data in different regions in a frame to be searched are the same, the data are prevented from being processed or handled as the same entry because values of search identifiers are different from each other. Namely, a difference between layer 2 frames or a difference between layer 3 protocols can be correctly determined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a diagram showing an example of a protocol table corresponding to the header form of the frame and the frame format shown in FIG. 6;

FIG. 9 is a diagram showing an example of a frame analysis processing performed by the protocol analysis portion shown in FIG. 4; and FIG. 10 is a diagram showing an example of a protocol table used for the frame analysis processing shown in FIG. 9.

DETAILED DESCRIPTION OF THE INVENTION

Figure 1:
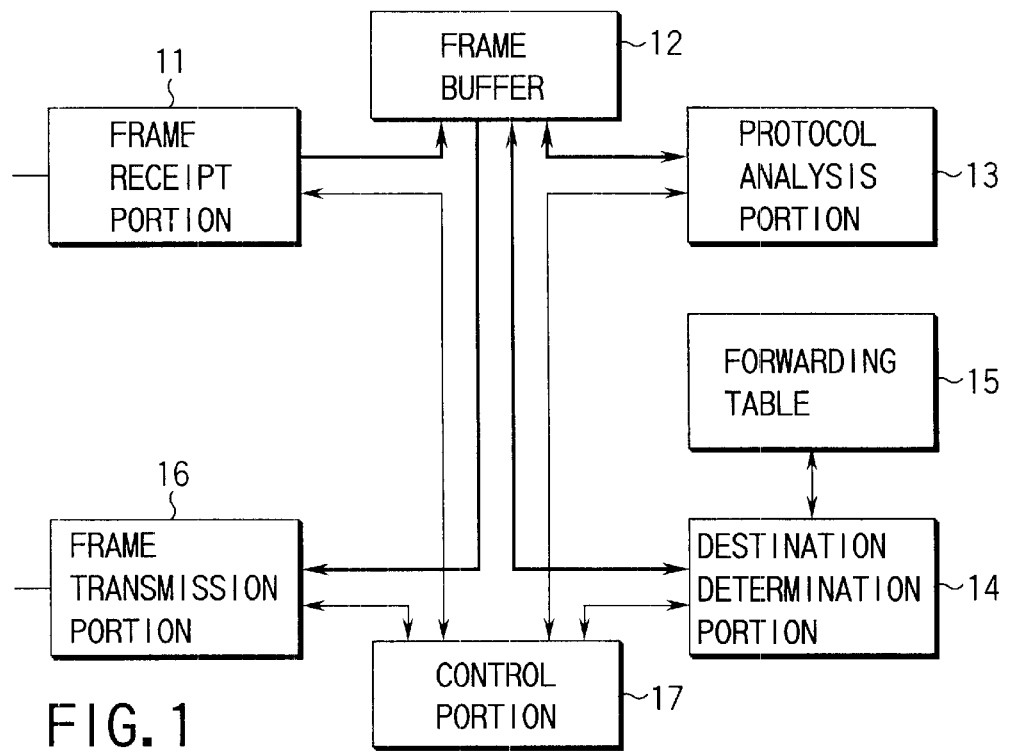
FIG. 1 is a circuit block diagram showing one example of a configuration of a conventional internetwork relay apparatus.
Figure 2:
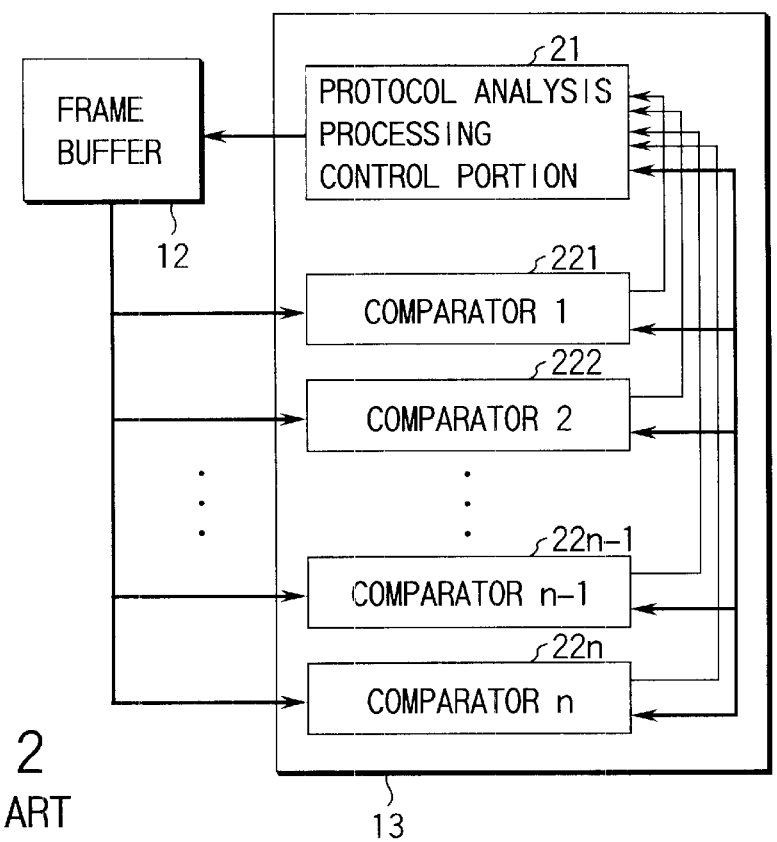
FIG. 2 is a circuit block diagram showing a configuration of a protocol analysis of the apparatus shown in FIG. 1.
Figure 3:
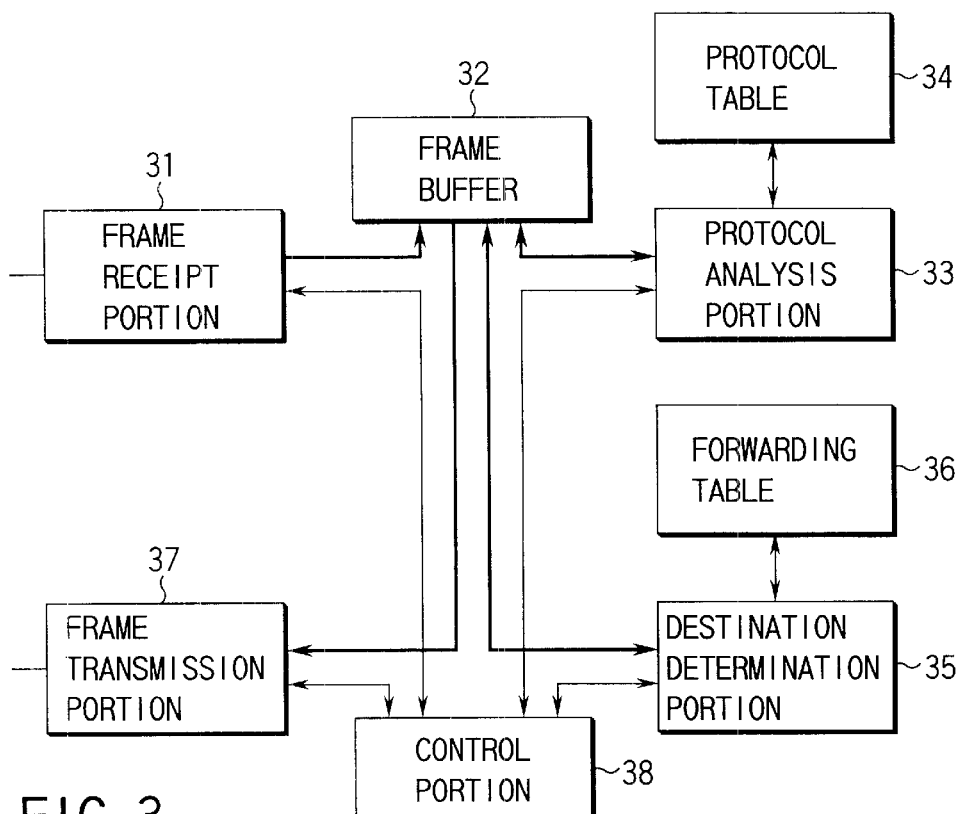
FIG. 3 is a circuit block diagram showing an embodiment of an internetwork relay apparatus according to the present invention.

FIG. 3 is a schematic configuration diagram showing an embodiment of an internetwork relay apparatus according to the present invention.

Like the above mentioned conventional apparatus, in an internetwork relay apparatus of this embodiment, also, a relay processing of a frame is performed for each processing of frame receipt, protocol analysis, destination determination and frame transmission processings. The above processings are respectively performed by a frame receipt portion 31, a protocol analysis portion 33, a destination determination portion 35 and a frame transmission portion 37, and control among the respective processings is performed by a control portion 38.

The frame receipt portion 31 receives each frame which has been transmitted from an upstream network (not shown), and stores the received frame in a frame buffer 32. Then, the frame receipt portion 31 notifies the control portion 38 of completion of reception for each frame reception completion, and receives a frame buffer address for storing the next frame from the control portion 38.

When the protocol analysis portion 33 is notified from the control portion 38 that an unprocessed received frame has been stored in the frame buffer 32, it reads frame data of the unprocessed received frame from the frame buffer 32 to determine the layer 2 frame form and the layer 3 protocol of the frame using a protocol table 34. The protocol table 34 is constituted with a CAM (Content Addressable Memory). When data provided from the above protocol analysis portion 33 is included in entries within the CAM, the CAM notifies the protocol analysis portion 33 that there is an entry coinciding with the data and it has a function for outputting accompanying data or associative data.

For example, by providing predetermined 2 bytes included in field data showing the layer 2 frame form and the layer 3 protocol of the received frame output from the protocol analysis portion 33 to the protocol table 34 as Key Data, information representing the layer 2 frame form and the layer 3 protocol of the received frame can be obtained from the protocol table 34.

However, since a search is performed in the protocol table 34 using a portion (2 bytes) of the field data as Key Data, there is a possibility of coincidence of the portion of the field data provided as the above Key Data even between different layer 2 frame forms or different layer 3 protocols. In this embodiment, therefore, a search is performed in the protocol table 34 with the portion of the field data and a search identifier (Group and Sequence No.) added thereto. Herein, the Group is used to roughly classify search sequences, and the Sequence No. indicates the number of search times in the same Group number.

Accordingly, even when a portion of field data provided to the protocol table 34 as Key Data coincides with one in another layer 2 frame form or layer 3 protocol, the portion of field data can securely be identified from the another layer 2 frame form or layer 3 protocol by a difference in search identifier.

The Group number used for search is determined by the CAM search result immediately before the search except for an initial search, and it does not directly correspond to a layer 2 frame form or a layer 3 protocol one to one.

After completion of the determination about the layer 2 frame form or the layer 3 protocol, the protocol analysis portion 33 stores the determination result in the frame buffer 32 and notifies a completion notification to the control portion 38. Furthermore, when an unprocessed received frame is still stored in the frame buffer 32, a protocol analysis processing is sequentially performed on the unprocessed received frame like the above analysis processing. When the destination determination portion 35 is notified from the control portion 38 that an unprocessed received frame is stored in the frame buffer 32, it reads a destination address of a layer 3 header from the frame buffer to determine a destination of the received frame using a forwarding table 36. After the completion of the determination, the destination determination portion 35 stores the destination of the frame in the frame buffer 32 and notifies a completion notification to the control portion 38. This destination determination processing is performed on each of all of unprocessed received frames which is stored in the frame buffer 32.

Since processings and data positions to be performed differ due to differences in layer 2 frame form and layer 3 protocol, after the determination results of the layer 2 frame form and the layer 3 protocol which is stored in the frame buffer 32 is read out, the destination determination processing is performed by reading frame data.

As soon as the frame transmission portion 37 is notified from the control portion 38 that a frame to be transmitted is stored in the frame buffer 32, it reads a destination to be transmitted and frame data to be transmitted from the frame buffer 32 on the basis of a frame buffer address which has been notified from the control portion 38 to transmit them to a desired destination. Then, when the transmission is completed, the frame transmission portion 37 notifies a completion notification to the control portion 38.

The control portion 38 performs control among respective processing blocks, and manages the frame buffer address where an unprocessed frame is stored for each processing.

Figure 4:
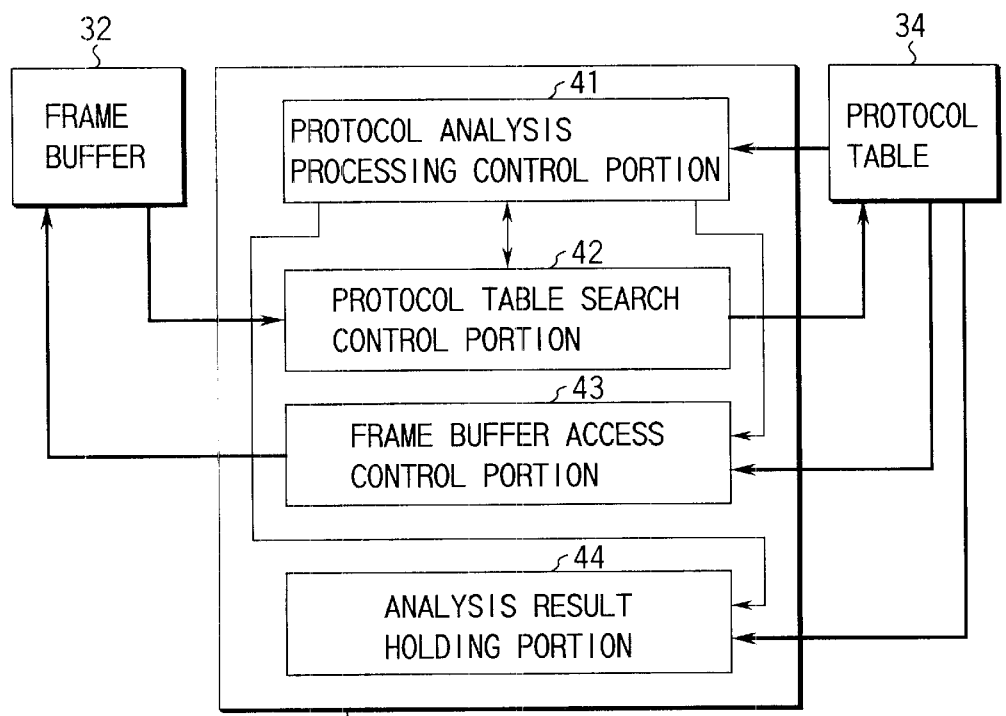
FIG. 4 is a circuit block diagram showing a configuration of a protocol analysis portion of the apparatus shown in FIG. 3.

The above protocol analysis portion 33 is configured in the following manner. FIG. 4 is a circuit block diagram showing a configuration of the protocol analysis portion 33. That is, the protocol analysis portion 33 comprises a protocol analysis processing control portion 41, a protocol table search control portion 42, a frame buffer access control portion 43, and an analysis result holding portion 44.

As soon as the protocol analysis processing control portion 41 is notified from the control portion 38 that an unprocessed frame is stored in the frame buffer 32, it requests the frame buffer access control portion 43 to read frame data from the frame buffer address which has been notified from the control portion 38.

When the frame buffer access control portion 43 defines a head byte as the first byte, data of the 13th to 14th bytes counted from the head byte are read out. This is because, when a value described at the 13th to 14th bytes from the head byte of this frame is 1500 or less, the data indicates the length (the length of data of 15th byte and the following bytes) of a layer 3 packet, while the value of the 13th to 14th bytes from the first byte indicates a protocol (a protocol of the data of the 15th byte and the following bytes) of a layer 3 packet when the value described at the 13th to 14th bytes from the head byte of the frame is more than 1500. This is because, as the maximum length of data is 1500 bytes in Ethernet, data length of 1501 bytes or more is impossible.

Incidentally, the head byte of the frame is defined as the 0th byte in some cases. In this case, data to be read out is data of the 12th to 13th bytes from the head byte. In this embodiment, however, the head byte of a frame is defined as the first byte, and explanation will be given hereinafter.

The protocol table search control portion 42 determines whether the value of 13th to 14th bytes read is 1500 or less, or more than 1500. Then, when the value of 13th to 14th bytes is more than 1500, a search is performed in the protocol table 34 with data (Key Data) of the 13th to 14th bytes and a search identifier (Group=0, Sequence No.=0) added thereto.

On the other hand, when the value of the 13th to 14th bytes is 1500 or less, 2 bytes following the above 13th to 14th bytes, namely data of the 15th to 16th bytes, is read out from the frame buffer 32. The protocol table search control portion 42 performs a search in the protocol table 34 using the read data used as Key Data and a search identifier (Group=1, Sequence No.=0) added thereto. The reason of setting Group=1 is for distinguishing this case from the case that the value of 13th to 14th bytes counted from the head byte of the frame is more than 1500.

That is, in the first search in the protocol table 34, when the value of 13th to 14th bytes is determined to be more than 1500, the Group No. is set to 0, while the Group No. is set to 1 when the value thereof is determined to be 1500 or less, and a search is performed in the protocol table 34.

As a result of the above search, when there is an entry coinciding with the protocol table 34, there are two types as associative data obtained from the protocol table 34 according to a case that a layer 2 frame form and a layer 3 protocol have been determined and a case that a search must be further performed. When determinations of a layer 2 frame form and a layer 3 protocol made by the provided search data are completed, information (End) showing a completion of the protocol analysis with the current search and the determined layer 2 frame form (L2 Frame) and layer 3 protocol (L3 Protocol) are obtained, and further a head position (L3 Head Pointer) of a layer 3 header used in the destination determination portion 35 is obtained.

When the determinations of the layer 2 frame form and layer 3 protocol are not completed with the provided search data and the search is further needed, information (Search) for showing that further protocol analysis should be performed and information for specifying Group No. (Next Group) used in the next search and for specifying (Next Pointer) that data of what number counted from the current frame data position should be defined as the next Key Data are obtained. In this case, the frame buffer access control portion 43 accesses the frame buffer 32 with the address of the frame buffer pointer positioned just before the current pointer plus Next pointer to read the following two byte data.

The protocol table search control portion 42 accesses the protocol table 34 with the data read from the frame buffer 32 and used as Key Data, and a search identifier (Group=Next Group, Sequence No.) added thereto. At this time, a search is performed again with 0 set to the Sequence No. when Group used for the previous search is different from Next Group or with the Sequence No. obtained by incrementing 1 when the former is the same as the latter.

The protocol analysis portion 33 repeats search in the protocol table 34 until the layer 2 frame form and the layer 3 protocol are identified. The layer 2 frame form and the layer 3 protocol determined are stored in an analysis result holding portion 44.

Next, protocol analysis operation of the apparatus thus configured will be explained.

Herein, a case where a frame data in which the layer 2 frame form is a DIX form and the layer 3 protocol is IPV4 and a frame data in which the layer 2 frame form is LLC header+SNAP header form and the layer 3 protocol is IPX are respectively identified to be subjected to relay processings on the Ethernet is explained as one example.

Figure 5:
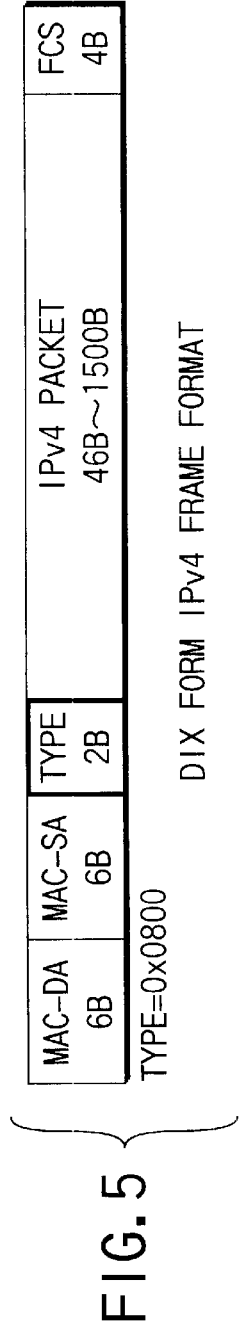
FIG. 5 is a diagram showing a first example of a header form of a frame and a frame format.
Figure 6:
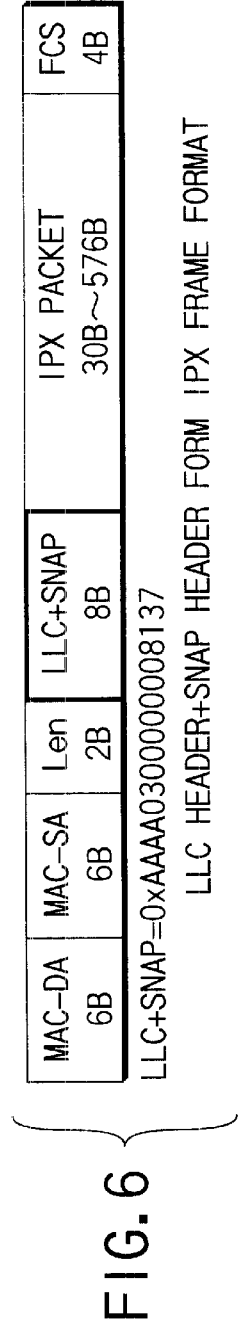
FIG. 6 is a diagram showing a second example of a header form of a frame and a frame format.
Figure 7:
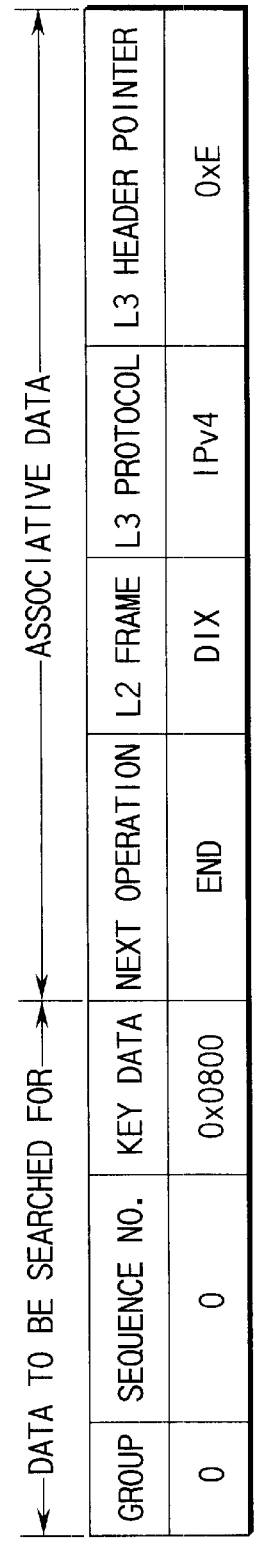
FIG. 7 is a diagram showing an example of a protocol table corresponding to the header form of the frame and the frame format shown in FIG. 5.

FIG. 5 shows a frame format of the DIX form and IPV4, and FIG. 7 shows the contents of an entry which has been set in the protocol table 34 in order to determine the DIX form and IPV4. Also, FIG. 6 shows a frame format of the above LLC header+SNAP header form and IPX, and FIG. 8 shows the contents of an entry which has been set in the protocol table 34 in order to determine the LLC header+ SNAP header form and IPX.

When the above frame is received and stored in the frame buffer 32, the protocol analysis portion 33 first reads data of the 13th to 14th bytes of the above received frame from the frame buffer 32 to determine the contents of the data. For example, it is now assumed that the data of the 13th to 14th bytes read from the frame buffer 32 is 0x0800. In this case, since 0x0800 is more than 1500 in the decimal system, the protocol analysis portion 33 determines that the data (0x0800) of the 13th to 14th bytes indicates a protocol of the layer 3 packet. Then, a search is performed in the protocol table 34 with the data (0x0800) of the 13th to 14th bytes used as Key Data as it is and with Group=0, Sequence No.=0 added thereto.

Meanwhile, an entry corresponding to the above data to be searched, as shown in FIG. 7, is preliminarily stored in the protocol table 34. Therefore, the protocol analysis portion 33 is notified from the protocol table 34 that there is an entry coinciding with the data, and associative data (Next Operation=End, L2Frame=DIX, L3 Protocol=IPv4, L3 Header Pointer=0xE) is read out.

Since this read associative data is Next Operation=End, the protocol analysis portion 33 determines a search completion and recognizes that L2Frame=DIX, L3 Protocol=IPv4 contained in the associative data are the frame form, the protocol of the received frame.

On the other hand, it is assumed that the data of the 13th to 14th bytes read from the frame buffer 32 is 1500 or less in the decimal system. At this case, the protocol analysis portion 33 determines that the data of the 13th to 14th bytes indicates the length of a layer 3 packet and accesses the frame buffer 32 again to read data of the 15th to 16th bytes following the above 13th to 14th bytes. Then, a search is performed in the protocol table 34 with data 0xAAAA of the 15th to 16th bytes used as Key Data and Group=1, Sequence No.=0 added thereto.

Meanwhile, an entry corresponding to the data to be searched as shown in the first line in FIG. 8 is previously registered in the protocol table 34. Therefore, it is notified from the protocol table 34 to the protocol analysis portion 33 that there is an entry coinciding with the data, and associative data (Next Operation=Search, Next Group=1, Next Pointer=0x02) is read out.

Since the associative data read is Next Operation=Search, the protocol analysis portion 33 determines a search continuation and reads data of 2 bytes following the 15th byte+2 bytes continuous thereto, namely 0x0300, from the frame buffer 32 on the basis of Next Pointer=0x02 contained in the associative data to use this data as new Key Data and to perform a search in the protocol table 34 again with the data and Next Group=1, Sequence No.=1 of the above associative data added thereto.

Since an entry corresponding to the above data to be searched, as shown in the second line in FIG. 8, is registered in the protocol table 34, it is notified from the protocol table 34 to the protocol analysis portion 33 that there is an entry coinciding with the data, and associative data (Next Operation=Search, Next Group=1, Next Pointer=0x02) is read out.

Since the associative data read is Next Operation=Search, the protocol analysis portion 33 determines a search continuation again, and generates the next data to be searched on the basis of Next Pointer=0x02 and Next Group=1 contained in the associative data, thereby performing a search in the protocol table 34 once again. The protocol analysis portion 33 repeats the search in the protocol table 34 according to the contents of the associative data in the above manner as long as the associative data which has been read from the protocol table 34 is Next Operation=Search.

It is assumed that associative data which has been read from the protocol table 34 has become Next Operation=End as a result of a plurality of searches. Then, the protocol analysis portion 33 determines a search completion and recognizes that L2Frame=LLC+SNAP, L3 Protocol=IPX contained in the associative data are the frame form, the protocol of the received frame.

Thus, it is made possible that a frame data of DIX form and IPV4 frame format, and a frame data of LLC header+SNAP header form and IPX frame format are respectively identified to be subjected to relay processings on Ethernet.

In this embodiment, identification among a plurality of types of protocols where portions of field data become the same value is performed using search identifiers (Group Nos. and Sequence Nos.) in the protocol analysis processing, as set forth above. The operation will be explained in detail with reference to FIGS. 9 and 10.

FIG. 9 shows formats of frames to be determined, and FIG. 10 shows an example of setting a protocol table used to determine layer 2 frame forms and layer 3 protocols from the respective formats. As shown in FIG. 9, it is assumed that a header of frame 1 is 0x02000800, a header of frame 2 is 0x200AAAA030000000800, and a header of frame 3 is 0x0200AAAA030000070800, which are required to identify layer 2 frame forms and layer 3 protocols, and the layer 2 frame forms and layer 3 protocols of the respective frames can be determined on these headers. Incidentally, in FIG. 9, each 0x0200 is a data field for determining whether or not it is more than 1500.

In the embodiment, data of these headers are identified by performing a plurality of searches in the protocol table 34, as shown in FIG. 10. That is, the Group Nos. are required taking in consideration identification between the frame 2 and the frame 3. Namely, in the third search, the frame 2 is Key Data=0x0000 while the frame 3 is Key Data=0x0007, and, in the fourth search, the both are Key Data=0x0800. In this case, it is possible to identify the frame 2 and the frame 3 from each other by setting Next Group to "2" in the third search result, even when Key Data of the frame 2 and Key Data of the frame 3 in the fourth search are the same.

Also, the Sequence No. is required taking in consideration identification between the frame 1 and the frame 2. That is, determination of the frame 1 terminates at Key Data=0x0800, Group=1, Sequence No.=0 in the first search, while determination of the frame 2 terminates at Key Data=0x0800, Group=1, Sequence No.=3 in the fourth search. The final determination is made at Key Data=0x0800 in both the frames, but Sequence Nos. are different from each other in both the frame, so that the both are prevented from being processed or handled as the same.

As set forth above, in this embodiment, corresponding to a plurality of types of frame forms and protocols to be relayed, header data representing these are divided into each 2 bytes to set a plurality of search sequences, an entry including the above divided 2 bytes serving as Key Data, a search identifier comprising Group No. and Sequence No., information indicating a search continuation or a search termination, and associative data including a position of Key Data to be searched next and Group No. used is created for each search system, and the entry is preliminarily stored in the protocol table 34 comprising CAM. Then, each time when frame data is received and stored in the frame buffer 32, a search is performed in the protocol table 32 by the protocol analysis portion 33 using 2 bytes at a specific position of the frame data as Key Data, and the search in the protocol table 34 is repeated according to the contents of associative data read from the protocol table 34 until the search is terminated.

Accordingly, the layer 2 frame form and the layer 3 protocol can be identified with data registered in the protocol table 34 comprising CAM. As a result, even when there are many types of layer 2 frame forms and layer 3 protocols to be identified, it is unnecessary to provide comparators so as to correspond to the respective types, so that the circuit scale of the protocol analysis portion 34 can be reduced.

Also, even when it is required to identify a novel layer 2 frame form and a novel layer protocol, such a requirement can be achieved by simply registering corresponding data in the protocol table 34, whereby addition of a novel circuit is made unnecessary.

Furthermore, since header data representing a layer 2 frame form and a layer 3 protocol is divided into each two bytes and a search in the protocol table 34 is performed using this two bytes as Key Data, it is made possible to represent a common Key Data as one entry, so that the number of reading-out times until an entry coinciding with the frame to be subjected to relay processing is found out can be reduced. Accordingly, processing performance can be improved as compared with a case where an entry is found out for each header data using a conventional memory.

In addition, since a search in the protocol table 34 is performed using a combination of a portion of field data and an search identifier as Key, even when data in different regions in a frame to be searched are the same, they can be prevented from being processed as the same entry because of values of the search identifiers of the data. Namely, difference among layer 2 frame forms or layer 3 protocols can be determined correctly.

Incidentally, the present invention is not limited to the above embodiment. For example, in the embodiment, the system using Ethernet as media has been explained, but the present invention is applicable to a case of other media in the same manner as the above.

Also, in the above embodiment, the case where the layer 2 frame form and layer 3 protocol are identified has been explained as the example, but the present invention is applicable to a protocol of a transport layer corresponding to a layer 4, a port number or the like and a further upper layer.

In addition to the above, the present invention can be implemented by performing various modifications on the structure of an entry of a protocol table, the length of partial data serving as Key Data, the structure and/or type of a network, the types of a frame form and a protocol, or the like without departing from the spirit or scope of the invention.

Furthermore, in the above embodiment, field data representing a protocol is divided each 2 bytes into a plurality of portion data in view of an effective use of a memory, but the field data can be divided into any number of bytes so as to meet a memory capacity of a protocol table, or the field data may be stored in the protocol table without division.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An internetwork relay apparatus for analyzing a form and a protocol of a received transmission frame from the contents of field data of the received frame to perform relay processing on the transmission frame according to the analyzed result, comprising:

a first memory where field data representing a frame form and a protocol of each of all transmission frames to be subjected to relay processing is divided into a plurality of portion data each having a predetermined length, a plurality of search sequences different from one another are set on the basis of the portion data, and, for each sequence, associative data representing search control contents in the sequence is preliminarily stored so as to be associated with the portion data constituting the search sequence and a search identifier representing the search sequence;

a second memory in which the transmission frame received is temporarily stored;

first search means, each time when a transmission frame is stored in the second memory, for selectively reading one of the portion data from the field data to perform a search in the first memory on the basis of the portion data and the search identifier representing the search sequence;

second search means for reading other portion data from the second memory according to an instruction of the associative data read from the first memory to perform a search in the first memory on the basis of the other portion data read and the search identifier included in the associative data; and determination means for determining a search completion or a search continuation on the basis of the associative data read from the first memory by the first and second search means and for causing the second search means to perform search processing repeatedly in a case of the search continuation and outputting information representing the transmission frame form and the protocol of the transmission frame included in the associative data read in a case of the search termination;

wherein the search identifier comprises group information for representing the search sequence and a sequence number for representing the number of search times in each search sequence.

2. An internetwork relay apparatus for analyzing a form and a protocol of a received transmission frame from the contents of field data of the received frame to perform relay processing on the transmission frame according to the analyzed result, comprising:

a first memory where field data representing a frame form and a protocol of each of all transmission frames to be subjected to relay processing is divided into a plurality of portion data each having a predetermined length, a plurality of search sequences different from one another are set on the basis of the portion data, and, for each sequence, associative data representing search control contents in the sequence is preliminarily stored so as to be associated with the portion data constituting the search sequence and a search identifier representing the search sequence;

a second memory in which the transmission frame received is temporarily stored;

first search means, each time when a transmission frame is stored in the second memory, for selectively reading one of the portion data from the field data to perform a search in the first memory on the basis of the portion data and the search identifier representing the search sequence;

second search means for reading other portion data from the second memory according to an instruction of the associative data read from the first data read and the search identifier included in the associative data; and determination means for determining a search completion or a search continuation on the basis of the associative data read from the first memory by the first and second search means and for causing the second search means to perform search processing repeatedly in a case of the search continuation and outputting information representing the transmission frame form and the protocol of the transmission frame included in the associative data read in a case of the search termination;

wherein the associative data comprises information for representing the search continuation or the search termination, information for specifying a reading-out position of the portion data to be searched next, and information for specifying the search identifier to be used for the next search.

* * * * *